US012776704B2

(12) United States Patent
Lawrence

(10) Patent No.: US 12,776,704 B2
(45) Date of Patent: Oct. 27, 2026

(54) FLYING CAPACITOR VOLTAGE AND INDUCTOR CURRENT COMPENSATION FOR SERIES CAPACITOR BUCK TWO-LEVEL CONVERTER

(71) Applicant: Cirrus Logic International Semiconductor Ltd., Edinburgh (GB)

(72) Inventor: Jason W. Lawrence, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 175 days.

(21) Appl. No.: 18/679,104

(22) Filed: May 30, 2024

(65) Prior Publication Data

US 2025/0373154 A1 Dec. 4, 2025

(51) Int. Cl.
*H02M 3/07* (2006.01)
*H02M 1/00* (2006.01)
*H02M 3/158* (2006.01)

(52) U.S. Cl.
CPC ........... *H02M 3/07* (2013.01); *H02M 1/0095* (2021.05); *H02M 3/1586* (2021.05)

(58) Field of Classification Search
CPC ..... H02M 1/0095; H02M 3/1586; H02M 3/07
See application file for complete search history.

(56) References Cited

U.S. PATENT DOCUMENTS

2016/0261190 A1 9/2016 Shenoy
2023/0412079 A1* 12/2023 Parto .................. H02M 1/0009
2024/0055990 A1* 2/2024 Kawano .............. H02M 3/1584
2024/0305194 A1* 9/2024 Anderson ........... H02M 1/0095
2025/0337324 A1* 10/2025 Huang .................... H01F 27/30

OTHER PUBLICATIONS

International Search Report and Written Opinion of the International Searching Authority, International Application No. PCT/US2025/027918, mailed Sep. 16, 2025.
Shenoy, P. S., "Introduction to the Series Capacitor Buck Converter", Apr. 2016, Revised May 2016, Texas Instruments SLVA750A.
Biesterfeld, N. et al., "Steady-State Analysis of Series-Capacitor Buck Converters in Discontinuous Capacitor Voltage Mode", 2023 IEEE 24th Workshop on Control and Modeling for Power Electronics, IEEE, Jun. 25, 2023, pp. 1-6.

* cited by examiner

*Primary Examiner* — Alex Torres-Rivera
(74) *Attorney, Agent, or Firm* — Jackson Walker L.L.P.

(57) ABSTRACT

A system may include an SCB2L comprising a plurality of switches, a first power inductor and a second power inductor electrically coupled to the plurality of switches, and a flying capacitor electrically coupled to the plurality of switches, wherein the plurality of switches are controllable in a periodic manner among a plurality of switch configurations in order to generate an output voltage from an input voltage received by the SCB2L. The plurality of switch configurations may include a first switch configuration in which electrical charge on the flying capacitor is increased and a second switch configuration in which electrical charge on the flying capacitor is decreased. The system may also include a control subsystem configured to selectively increase and decrease a difference in time between a first duration of the first switch configuration and a second duration of the second switch configuration within switching cycles of the SCB2L.

36 Claims, 6 Drawing Sheets

FLYING CAPACITOR VOLTAGE AND INDUCTOR CURRENT COMPENSATION FOR SERIES CAPACITOR BUCK TWO-LEVEL CONVERTER

FIELD OF DISCLOSURE

The present disclosure relates in general to circuits for electronic devices, including without limitation personal audio devices such as wireless telephones and media players, and more specifically, closed-loop control of power converters, including series capacitor buck two-level power converters.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones, one or more speakers, haptic actuators, camera stabilization motors, and/or other loads. Such circuitry often includes a driver including a power amplifier for driving an output signal to such loads. Oftentimes, a power converter may be used to provide a supply voltage to a power amplifier in order to amplify a signal driven to speakers, headphones, other transducers, or other loads. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier. A power converter may be used to provide supply voltage rails to one or more components in a device. A power converter may also be used in other applications besides driving audio transducers, such as driving haptic actuators or other electrical or electronic loads. Further, a power converter may also be used in charging a battery from a source of electrical energy (e.g., an AC-to-DC adapter).

A type of power converter known as a series capacitor buck two-level power converter (SCB2L), which may also be known as a two-phase series capacitor buck converter, may be used in certain applications to convert an input DC voltage to a lower output DC voltage. An SCB2L combines a switched capacitor circuit and a multi-phase buck converter in a single conversion stage.

FIG. 1 illustrates selected components of an example circuit 100 for driving a load 120, as is known in the art. As shown in FIG. 1, a modulator 110 may receive one or more control parameters REF (e.g., which may be a digital signal indicative of a desired output voltage $V_{OUT}$ to be driven to load 120, a desired current $I_L$ to be driven through a power inductor of the modulator, and/or a desired flying capacitor voltage $V_{FLY}$), and based on such control parameter, generate switching control signals for controlling switches of an analog power stage 101, such as an SCB2L, for example. As an example, as shown in FIG. 1, modulator 110 may generate a pulse-width modulated (PWM) signal PWM1 and a PWM signal PWM2.

FIG. 1 depicts analog power stage 101 as an SCB2L, as is known in the art. As shown in FIG. 1, analog power stage 101 may receive an input voltage $V_{IN}$ and have an output configured to generate an output voltage $V_{OUT}$ based on switching signals received from modulator 110. An SCB2L may combine a switched capacitor circuit and a multiphase buck converter in a single conversion stage. As shown in FIG. 1, the SCB2L may include a first high-side switch 106*a* coupled to an input voltage $V_{IN}$ and a low-side switch 107*a* coupled between a first switching node and ground. A flying capacitor 104, which may serve as an energy storage device and may have flying voltage $V_{FLY}$ across its terminals, may be coupled between high-side switch 106*a* and the first switching node. A first power inductor 102*a* may be coupled between the first switching node and an output of analog power stage 101 having output voltage $V_{OUT}$. Further, a second high-side switch 106*b* may be coupled between first high-side switch 106*a* and a second switching node, a second low-side switch 107*b* may be coupled between the second switching node and ground, and a second power inductor 102*b* may be coupled between the second switching node and the output of analog power stage 101.

During operation, a power inductor current $I_{L1}$ may flow through power inductor 102*a* and a power inductor current $I_{L2}$ may flow through power inductor 102*b*. Further in operation, switches 106*a*, 106*b*, 107*a*, and 107*b* may be controlled by modulator 110 to regulate output voltage $V_{OUT}$ to a desired target voltage. For example, PWM signal PWM1 may control switches 106*b* and 107*b* such that switch 106*b* is activated and switch 107*b* is deactivated when PWM signal PWM1 is asserted and switch 106*b* is deactivated and switch 107*b* is activated when PWM signal PWM1 is deasserted. Likewise, PWM signal PWM2 may control switches 106*a* and 107*a* such that switch 106*a* is activated and switch 107*a* is deactivated when PWM signal PWM2 is asserted and switch 106*a* is deactivated and switch 107*a* is activated when PWM signal PWM2 is deasserted.

In operation, switches 106 and 107 may be controlled to regulate output voltage $V_{OUT}$ to a desired target voltage. As shown in FIG. 2, operation of analog power stage 101 may include cyclic, periodic commutation of switches 106 among a first state (φ1), a second state (φ2), a third state (φ3), and a fourth state (φ4). As shown in FIG. 2, switches 106*a* and 107*b* may be activated (and switches 106*b* and 107*a* deactivated) during the first state (φ1) in a VCS configuration, switches 107*a* and 107*b* may be activated (and switches 106*a* and 106*b* may be deactivated) during the second state (φ2) in a GS configuration, switches 106*b* and 107*a* may be activated (and switches 106*a* and 107*b* may be deactivated) during the third state (φ3) in a GCS configuration, and switches 107*a* and 107*b* may be activated (and switches 106*a* and 106*b* may be deactivated) during the fourth state (φ4) in the GS configuration.

The acronyms VCS, GS, and GCS stand for a path of current in each of the respective configurations, wherein "V" stands for the voltage supply, "C" stands for flying capacitor 104, "S" stands for the switching node, and "G" stands for ground voltage.

In existing approaches to switch control of an SCB2L, a controller may control a duty cycle of switching of the SCB2L in order to control output current $I_{OUT}=I_{L1}+I_{L2}$. However, in such existing approaches, there is no direct control of flying capacitor voltage $V_{FLY}$ or direct control of the current imbalance (e.g., $I_{L1}-I_{L2}$). In an ideal situation of balanced operation, flying capacitor voltage $V_{FLY}$ is equal to one-half of input voltage $V_{IN}$ and no current imbalance is present (e.g., $I_{L1}=I_{L2}$). When either of these two conditions are violated (e.g., $V_{FLY}\neq 0.5V_{FLY}$ and $I_{L1}\neq I_{L2}$), it may cause excess inductor current ripple and voltage ripple, which may further lead to reduced efficiency, degradation of transient performance, and possibly cause some components (e.g., transistors implementing switches 106 and 107) to operate outside of their safe operating area.

The SCB2L architecture of FIG. 1 has been described as "self-balancing," meaning no control is necessary to achieve a balanced condition. While the SCB2L circuit may converge to a balanced state over time, the transient process of the self-balancing process may be poor. During self-balancing, the currents and voltages may exhibit large, lightly-damped oscillations. Such behavior may be observed in the presence of resistive or inductive imbalance in the SCB2L circuit and with a load transient. Such oscillatory behavior is undesired and may lead to the problems described above. Further, if power inductors 102 are implemented using a coupled inductor or trans-inductor voltage regulator, maintaining current balance in the windings may be critical for preventing magnetic saturation in the inductive core.

SUMMARY

In accordance with the teachings of the present disclosure, one or more disadvantages and problems associated with operation of SCB2Ls may be reduced or eliminated.

In accordance with embodiments of the present disclosure, a system may include a series capacitor buck two-level power converter (SCB2L) comprising a plurality of switches, a first power inductor electrically coupled to the plurality of switches, a second power inductor electrically coupled to the plurality of switches, and a flying capacitor electrically coupled to the plurality of switches, wherein the plurality of switches are controllable in a periodic manner among a plurality of switch configurations in order to generate an output voltage from an input voltage received by the SCB2L. The plurality of switch configurations may include a first switch configuration in which electrical charge on the flying capacitor is increased and a second switch configuration in which electrical charge on the flying capacitor is decreased. The system may also include a control subsystem configured to selectively increase and decrease a difference in time between a first duration of the first switch configuration and a second duration of the second switch configuration within switching cycles of the SCB2L.

In accordance with these and other embodiments of the present disclosure, a method may be provided in a system having a series capacitor buck two-level power converter (SCB2L) comprising a plurality of switches, a first power inductor electrically coupled to the plurality of switches, a second power inductor electrically coupled to the plurality of switches, and a flying capacitor electrically coupled to the plurality of switches, wherein the plurality of switches are controllable in a periodic manner among a plurality of switch configurations in order to generate an output voltage from an input voltage received by the SCB2L. The method may include selectively increasing and decreasing, within switching cycles of the SCB2L, a difference in time between a first duration of a first switch configuration of the plurality of switch configurations in which electrical charge on the flying capacitor is increased and a second duration of a second switch configuration of the plurality of switch configurations in which electrical charge on the flying capacitor is decreased.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 3:
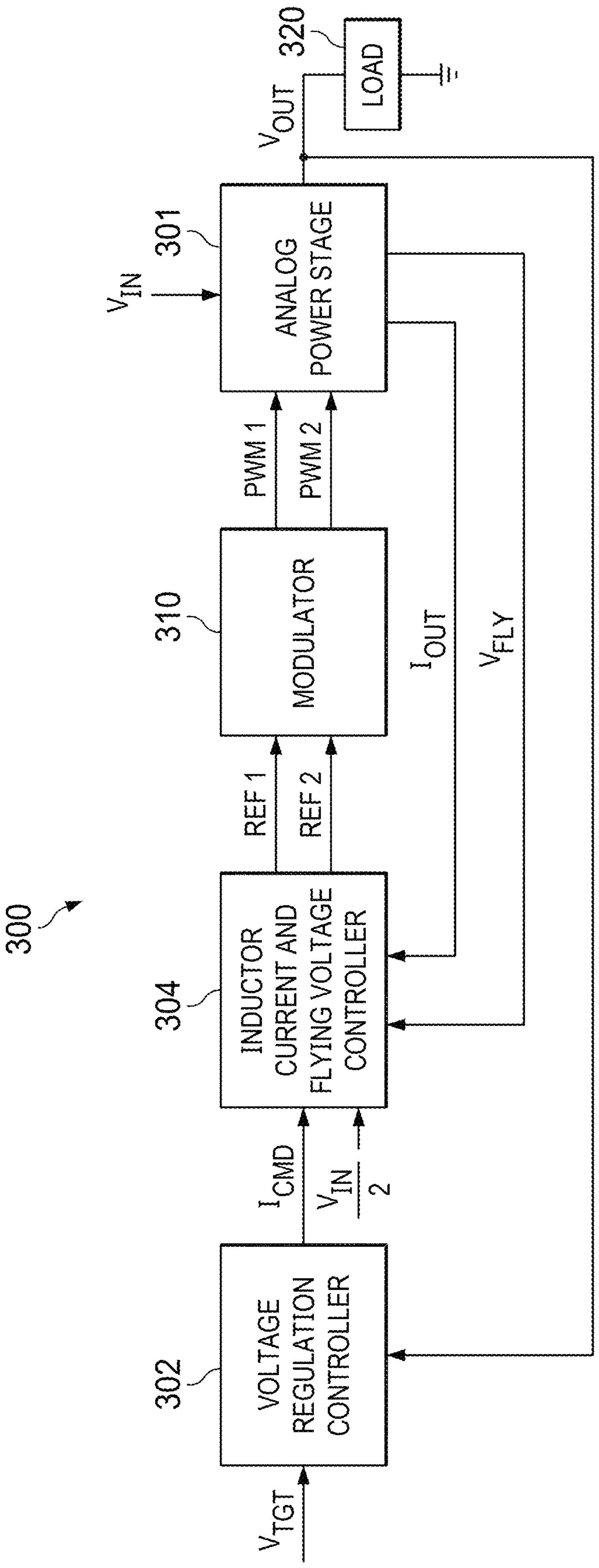
FIG. 3 illustrates a block diagram of selected components of an example system for driving a load using a switched analog power stage, in accordance with embodiments of the present disclosure.

FIG. 3 illustrates a block diagram of selected components of an example system 300 for driving a load 320 using a switched analog power stage 301, in accordance with embodiments of the present disclosure. As shown in FIG. 3, system 300 may include analog power stage 301, voltage regulation controller 302, inductor current and flying voltage controller 304, modulator 310, and load 320.

Analog power stage 301 may comprise any suitable system, device, or apparatus configured to drive an output current Jour and a voltage $V_{OUT}$ from a supply voltage $V_{IN}$ based on switch control signals provided from modulator 310. In some embodiments, analog power stage 301 may comprise an inductive- and/or capacitive-based power converter. In particular embodiments, analog power stage 301 may comprise an SCB2L power converter identical or similar to that discussed in the Background section of this application.

Voltage regulation controller 302 may comprise any system, device, or apparatus configured to implement a control loop to regulate voltage $V_{OUT}$ to track a target voltage $V_{TGT}$. For example, based on an error between target voltage $V_{TGT}$ and a measurement of voltage $V_{OUT}$, voltage regulation controller 302 may generate a commanded current $I_{CMD}$, which serves as a target setpoint current value for output current $I_{OUT}$ flowing from the output of analog power stage 301 in order to regulate voltage $V_{OUT}$ to target voltage $V_{TGT}$.

Inductor current and flying voltage controller 304 may comprise any system, device, or apparatus configured to, based on commanded current $I_{CMD}$ and a value equal to one half of supply voltage $V_{IN}$, generate two reference signals REF1 and REF2 for modulator 310.

Modulator 310 may comprise any suitable system, device, or apparatus configured to receive reference signals REF1 and REF2, and generate switching signals PWM1 and PWM2 for controlling switching of switches integral to analog power stage 301, as discussed in greater detail below. In some embodiments, modulator 310 may comprise a pulse-width modulator.

Figure 1:
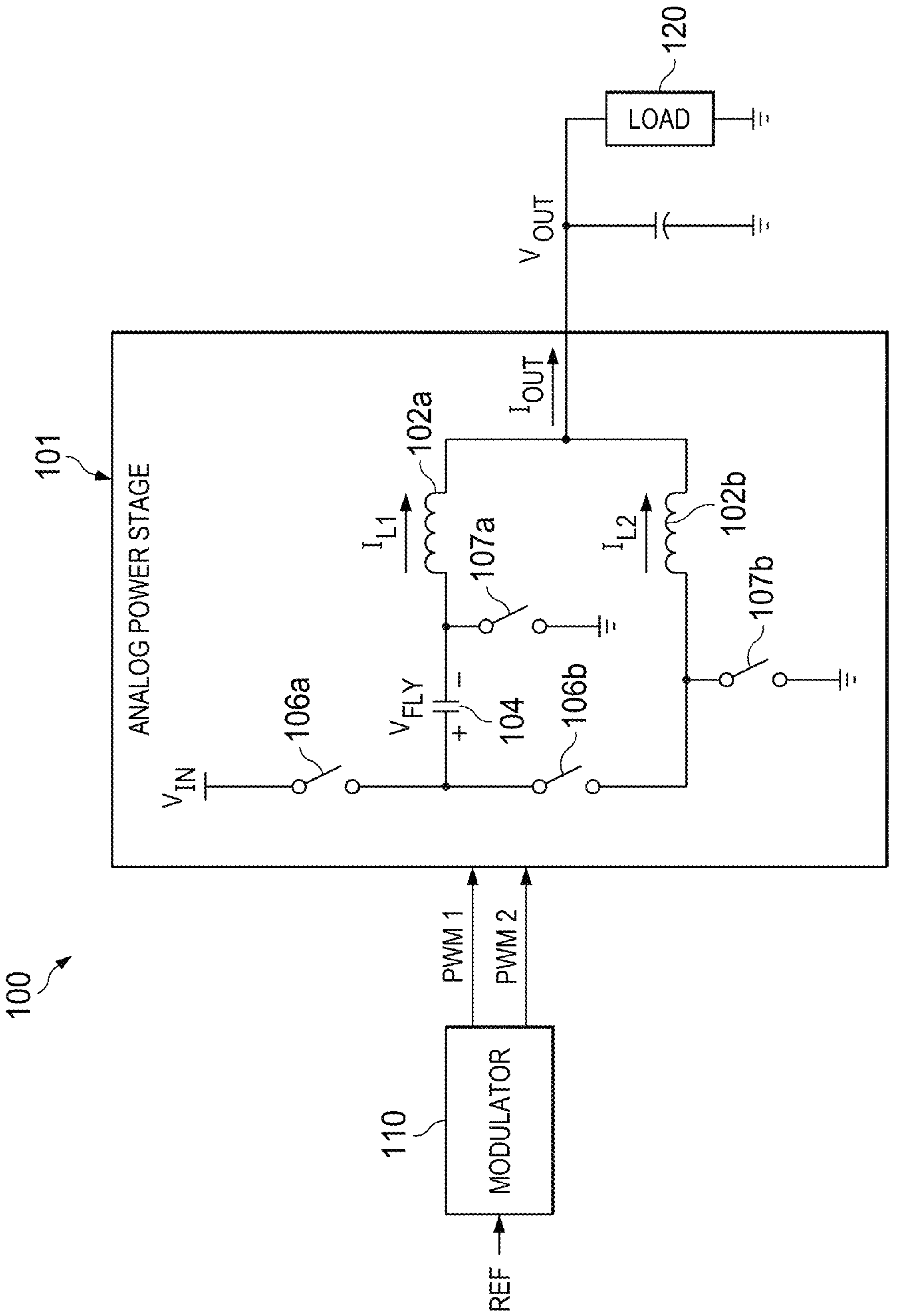
FIG. 1 (PRIOR ART)
FIG. 1 illustrates a circuit diagram of selected components of an example circuit for driving a load using an SCB2L, as is known in the art.
Figure 2:
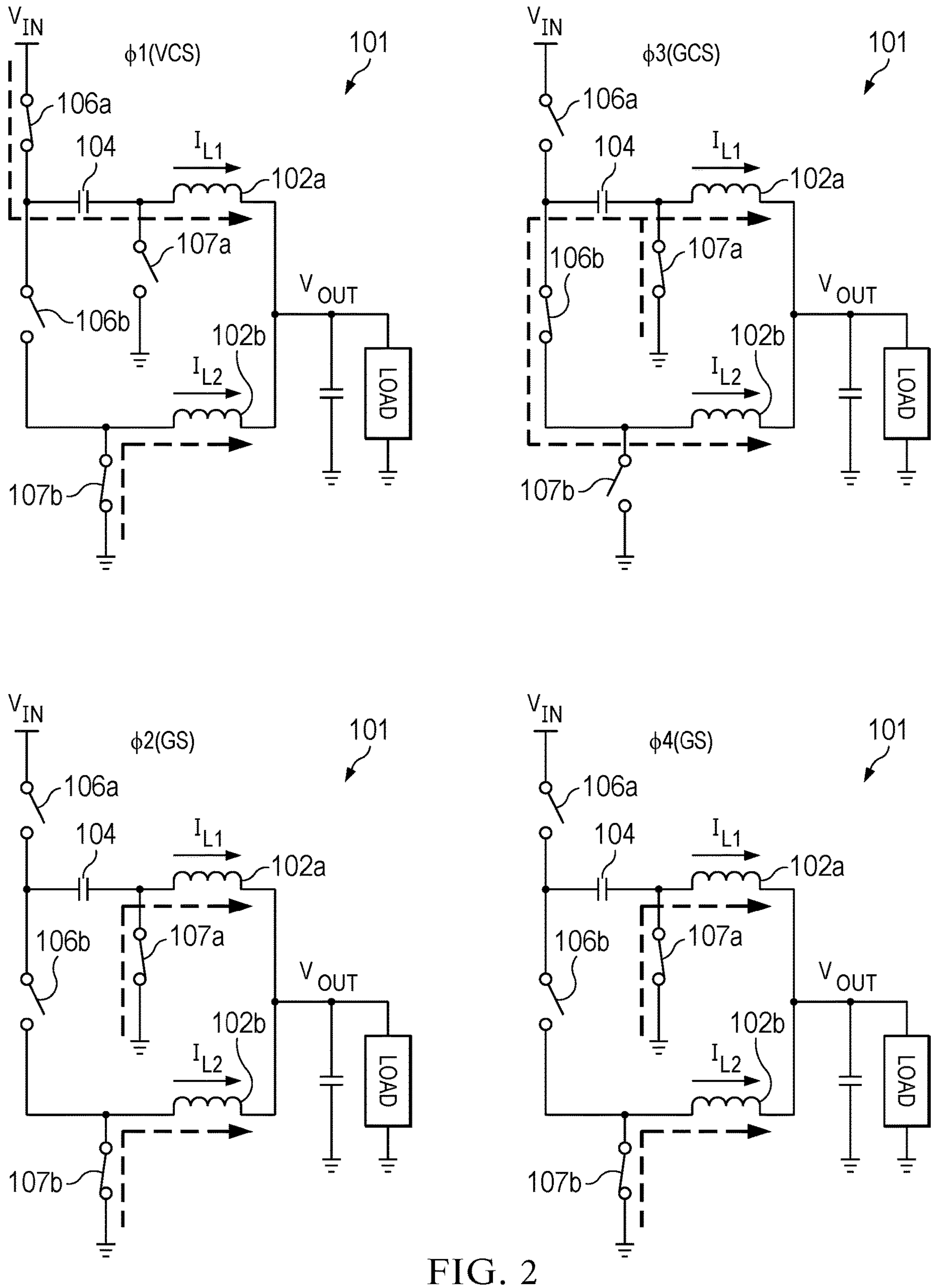
FIG. 2 (PRIOR ART)
FIG. 2 illustrates operation of the SCB2L depicted in FIG. 1, as is known in the art.

If analog power stage 301 is identical or similar to analog power stage 101 of FIG. 1, PWM signal PWM1 may control switches 106*b* and 107*b* such that switch 106*b* is activated and switch 107*b* is deactivated when PWM signal PWM1 is asserted and switch 106*b* is deactivated and switch 107*b* is activated when PWM signal PWM1 is deasserted. Likewise, PWM signal PWM2 may control switches 106*a* and 107*a* such that switch 106*a* is activated and switch 107*a* is deactivated when PWM signal PWM2 is asserted and switch 106*a* is deactivated and switch 107*a* is activated when PWM signal PWM2 is deasserted.

Load 320 may include any appropriate electrical or electronic load that may be powered from analog power stage 301, including without limitation a rechargeable battery.

Figure 4:
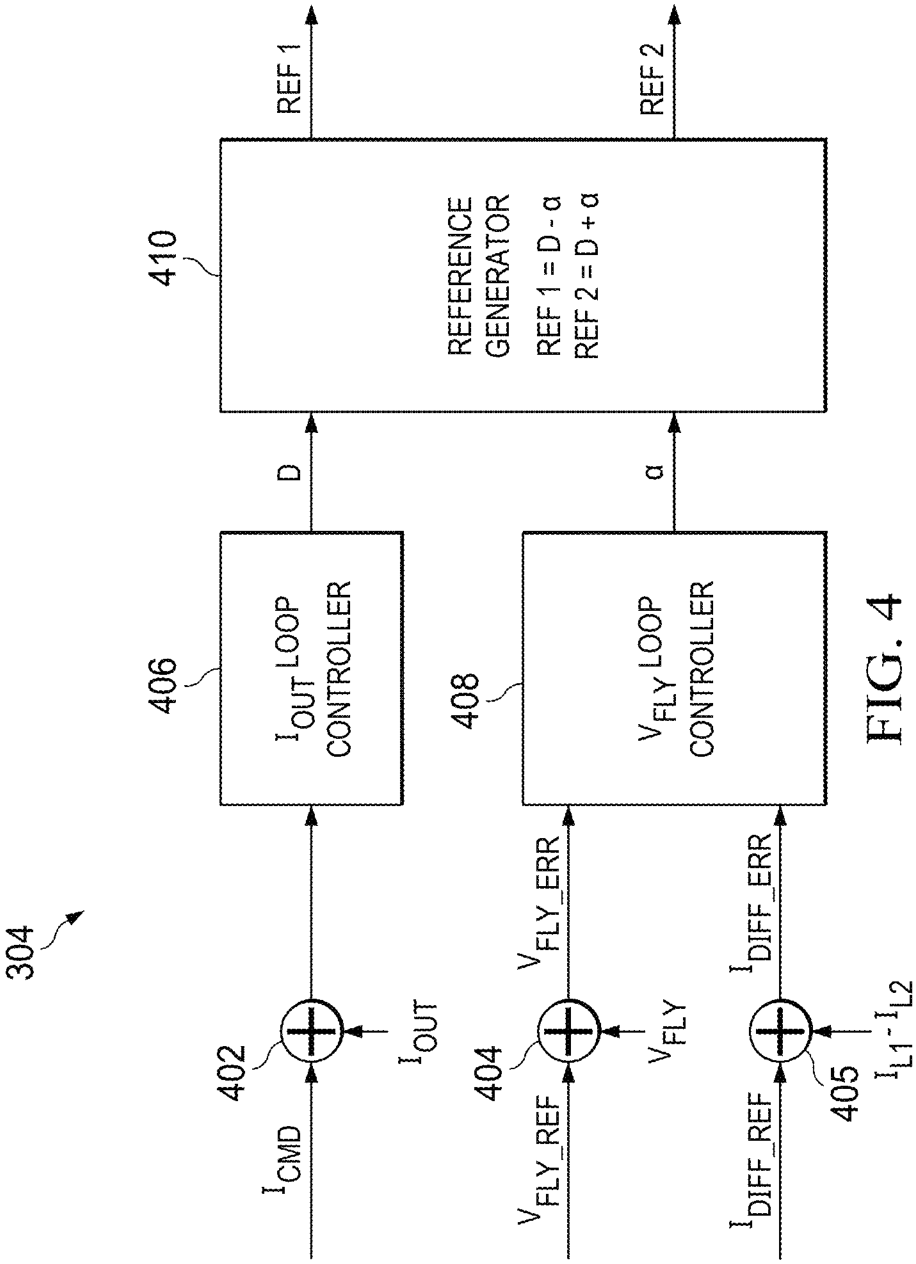
FIG. 4 illustrates a block diagram of selected components of an example inductor current and flying voltage controller, in accordance with embodiments of the present disclosure.

FIG. 4 illustrates a block diagram of selected components of an example inductor current and flying voltage controller 304, in accordance with embodiments of the present disclosure. As shown in FIG. 4, inductor current and flying voltage controller 304 may have an inductor current control loop for controlling output current $I_{OUT}$ and a flying capacitor voltage control loop for controlling flying capacitor voltage $V_{FLY}$. The inductor current control loop may include an error summer 402 and an $I_{OUT}$ loop controller 406. Error summer 402 may generate an error signal based on the difference between commanded current $I_{CMD}$ and output current $I_{OUT}$. $I_{OUT}$ loop controller 406 may generate a duty cycle signal D based on the error signal, increasing duty cycle signal D when power inductor current $I_{OUT}$ is below commanded current $I_{CMD}$ and decreasing duty cycle signal D when power inductor current $I_{OUT}$ is above commanded current $I_{CMD}$. In some embodiments, $I_L$ loop controller 406 may comprise a proportional-integral (PI) controller.

Similarly, the flying capacitor voltage control loop may include an error summer 404 and a $V_{FLY}$ loop controller 408. Error summer 404 may generate an error signal $V_{FLY\_ERR}$ based on the difference between a reference flying capacitor voltage $V_{FLY\_REF}$ and flying voltage $V_{FLY}$. $V_{FLY}$ loop controller 408 may generate an offset signal α based on error signal $V_{FLY\_ERR}$, increasing offset signal α when flying voltage $V_{FLY}$ is below reference flying capacitor voltage $V_{FLY\_REF}$ and decreasing offset signal α when flying voltage $V_{FLY}$ is above reference flying capacitor voltage $V_{FLY\_REF}$. In some embodiments, reference flying capacitor voltage $V_{FLY\_REF}$ may equal one-half of input voltage $V_{IN}$ (e.g., $V_{IN}/2$), but any suitable voltage level for reference flying capacitor voltage $V_{FLY\_REF}$ may be used.

As also shown in FIG. 4, the flying capacitor voltage control loop may also include an error summer 405. Error summer 405 may generate an error signal $I_{DIFF\_ERR}$ based on the difference between a reference current difference $I_{DIFF\_REF}$ (which may equal zero) and the difference between power inductor current $I_{L1}$ and power inductor current $I_{L2}$. Thus, in lieu of or in addition to generating offset signal α based on error signal $V_{FLY\_ERR}$, $V_{FLY}$ loop controller 408 may generate offset signal α based on error signal $I_{DIFF\_ERR}$, increasing offset signal α when the difference between power inductor current $I_{L1}$ and power inductor current $I_{L2}$ is below current difference error $I_{DIFF\_ERR}$ and decreasing offset signal α when the difference between power inductor current $I_{L1}$ and power inductor current $I_{L2}$ is above current difference error $I_{DIFF\_ERR}$. In some embodiments, $V_{FLY}$ loop controller 408 may comprise one or more proportional-integral (PI) controllers.

Either or both of the feedback values for flying voltage $V_{FLY}$ and current difference $I_{L1}$-$I_{L2}$ may be directly measured, or may be estimated by an observer (e.g., Kalman filter, Luenberger observer, sliding-mode observer, etc.) that uses a mathematical model of system 300 and measured states of system 300 to form its estimates.

As further shown in FIG. 4, inductor current and flying voltage controller 304 may include a reference generator 410. Reference generator 410 may include any system, device, or apparatus configured to generate reference signals REF1 and REF2 from duty cycle signal D and offset signal α. For example, as shown in FIG. 4, reference signal REF1 may be defined by REF1=D−α while reference signal REF2 may be defined by REF2=D+α. So, duty cycle signal D may be thought of as an average or common mode of reference signals REF1 and REF2, while offset signal α is an offset of reference signals REF1 and REF2 from such average or common mode.

Figure 5:
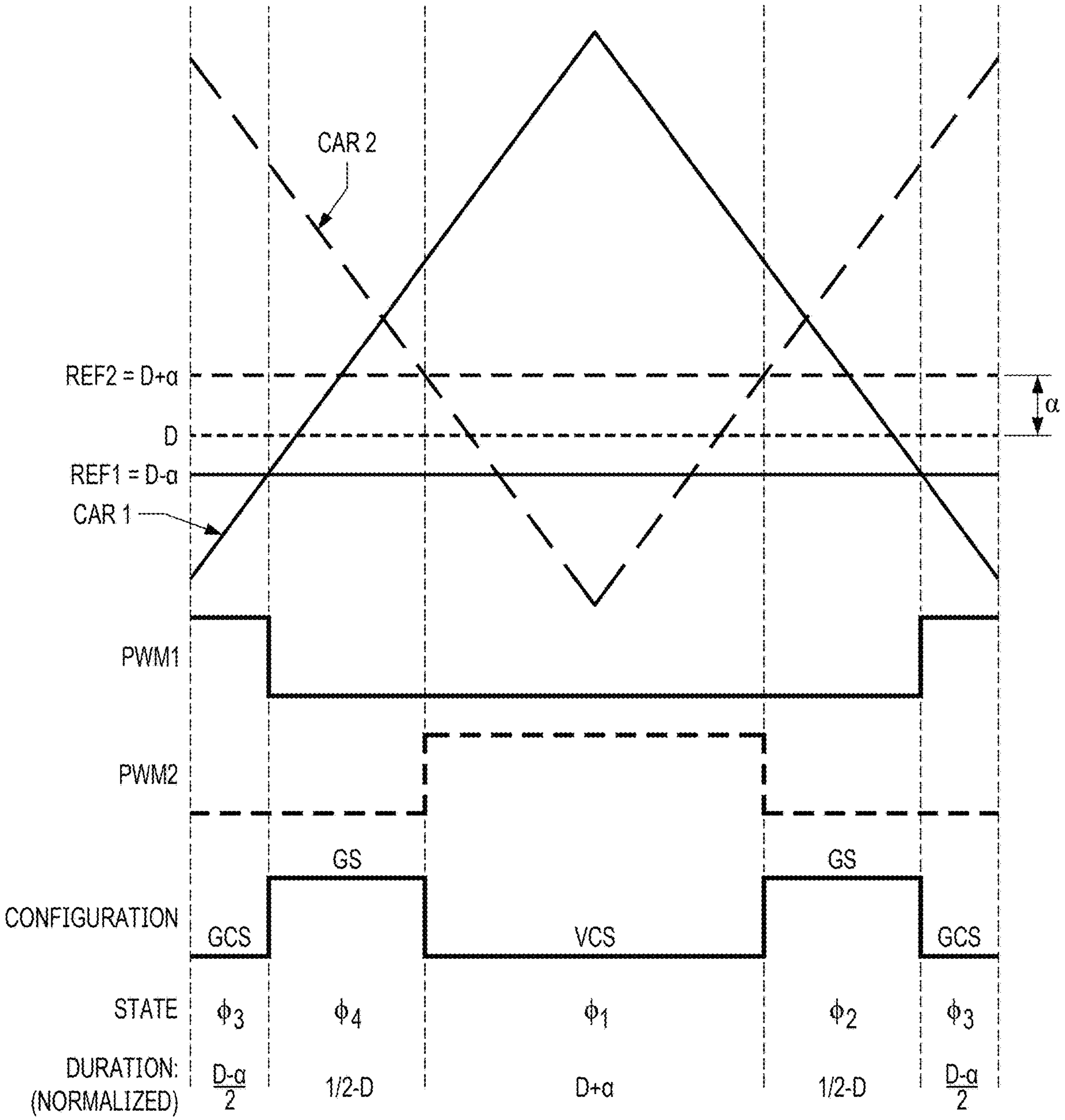
FIG. 5 illustrates generation of reference signals REF1 and REF2, in accordance with embodiments of the present disclosure.

Generation of reference signals REF1 and REF2 may be further illustrated by reference to FIG. 5. FIG. 5 depicts nominal waveforms of reference signals REF1, REF2, triangle wave carrier signals CAR1 and CAR2 of modulator 310, switching control signals PWM1 and PWM2, duty cycle signal D for output current $I_{OUT}$, output current $I_{OUT}$, and flying capacitor voltage $V_{FLY}$. As shown in FIG. 5, switching signal PWM1 may comprise a PWM signal generated by comparing reference signal REF1 to a first triangular carrier wave CAR1, such that switching signal PWM1 is asserted when reference signal REF1 exceeds first triangular carrier wave CAR1 and is deasserted when reference signal REF1 is less than first triangular carrier wave CAR1. Similarly, switching signal PWM2 may comprise a PWM signal generated by comparing reference signal REF2 to a second triangular carrier wave CAR2, wherein second triangular carrier wave CAR2 may be the opposite of first triangular carrier wave CAR1, such that switching signal PWM2 is asserted when reference signal REF2 exceeds second triangular carrier wave CAR2 and is deasserted when reference signal REF2 is less than second triangular carrier wave CAR2.

Offset signal α may control the difference in time (of skew) that the SCB2L converter spends in the GCS and VCS configurations. Using traditional approaches, the times spent in the VCS and GCS configurations were equal. Skewing the times in these configurations may simultaneously allow for control of flying capacitor voltage $V_{FLY}$ and the difference between power inductor current $I_{L1}$ and power inductor current $I_{L2}$.

Figure 6:
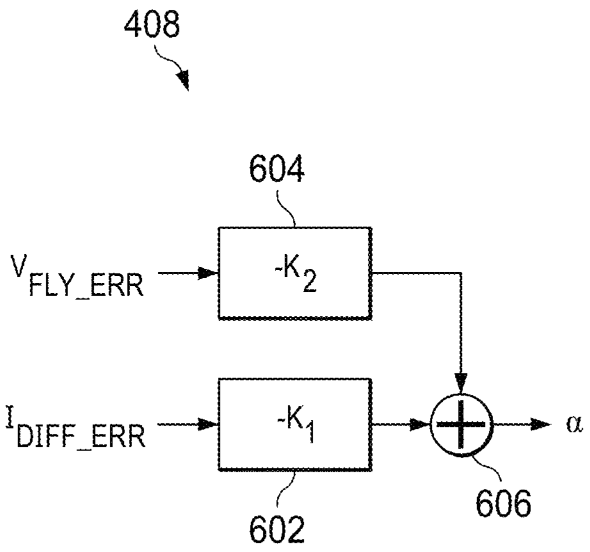
FIG. 6 illustrates a block diagram of selected components of a flying capacitor voltage loop controller, in accordance with embodiments of the present disclosure.

FIG. 6 illustrates a block diagram of selected components of $V_{FLY}$ loop controller 408, in accordance with embodiments of the present disclosure. As shown in FIG. 6, $V_{FLY}$ loop controller 408 may include a filter block 602, a filter block 604, and a summer 606. As shown in FIG. 6, filter block 602 may apply a gain $-K_1$ to error signal $I_{DIFF\_ERR}$ while filter block 604 may apply a gain $-K_2$ to error signal $V_{FLY\_ERR}$. Summer 606 may sum the outputs of filter block 602 and filter block 604 to generate offset signal α.

Either or both of filter block 602 and filter block 604 may comprise a proportional controller, proportional-integral controller, proportional-integral-differential controller, lead controller, lag controller, lead-lag controller, or other suitable controller. In addition or alternatively, either or both of gain $-K_1$ and gain $-K_2$ may vary during operation (e.g., gain scheduling) based on one or more operating parameters of system 300 (e.g., load, input voltage $V_{IN}$, output voltage $V_{OUT}$, etc.).

In some embodiments, gain $-K_1$ may be zero, such that feedback control by $V_{FLY}$ loop controller 408 is based on error signal $V_{FLY\_ERR}$. In other embodiments, gain $-K_2$ may be zero, such that feedback control by $V_{FLY}$ loop controller 408 is based on error signal $I_{DIFF\_ERR}$.

Although the foregoing discussion contemplates that power inductors 102*a* and 102*b* of analog power stage 301 are noncoupled inductors, in some embodiments, power inductors 102*a* and 102*b* may be coupled inductors (e.g., inductors having the same magnetic core). In other embodiments, power inductors 102*a* and 102*b* may be implemented by a trans-inductor voltage regulator.

In some embodiments, all or part of system 300 may be embodied in a program of computer-readable instructions and executed by a processing device, including without limitation a processor, application-specific integrated circuit, digital signal processor, or any other suitable processing device.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a series capacitor buck two-level power converter (SCB2L) comprising a plurality of switches, a first power inductor electrically coupled to the plurality of switches, a second power inductor electrically coupled to the plurality of switches, and a flying capacitor electrically coupled to the plurality of switches, wherein the plurality of switches are controllable in a periodic manner among a plurality of switch configurations in order to generate an output voltage from an input voltage received by the SCB2L, wherein the plurality of switch configurations comprises:

a first switch configuration in which electrical charge on the flying capacitor is increased; and a second switch configuration in which electrical charge on the flying capacitor is decreased; and a control subsystem configured to generate an offset signal independent of a duty cycle of the SCB2L and, based on the offset signal, selectively increase and decrease a difference in time between a first duration of the first switch configuration and a second duration of the second switch configuration within switching cycles of the SCB2L in order to control at least one of a flying capacitor voltage across the flying capacitor and a current difference between a first inductor current through the first power inductor and a second inductor current through the second power inductor.

2. The system of claim 1, wherein the control subsystem is further configured to selectively increase and decrease the difference in time in order to control a flying capacitor voltage across the flying capacitor.

3. The system of claim 2, wherein the control subsystem is further configured to:

determine an error signal between the flying capacitor voltage and a reference voltage;

apply a filter to the error signal to generate an offset signal; and selectively increase and decrease the difference in time based on the offset signal.

4. The system of claim 3, wherein a gain of the filter is time varying based on one or more operating parameters of the system.

5. The system of claim 4, wherein the one or more operating parameters comprise one or more of an output load of the SCB2L, the input voltage, and the output voltage.

6. The system of claim 2, wherein the control subsystem is further configured to estimate the flying capacitor voltage from an observer that uses a mathematical model of the system and measured states of the system to form an estimate of the flying capacitor voltage.

7. The system of claim 1, wherein the control subsystem is further configured to selectively increase and decrease the difference in time in order to control a current difference between a first inductor current through the first power inductor and a second inductor current through the second power inductor.

8. The system of claim 7, wherein the control subsystem is further configured to:

determine an error signal between the current difference and a reference current difference;

apply a filter to the error signal to generate an offset signal; and selectively increase and decrease the difference in time based on the offset signal.

9. The system of claim 8, wherein a gain of the filter is time varying based on one or more operating parameters of the system.

10. The system of claim 9, wherein the one or more operating parameters comprise one or more of an output load of the SCB2L, the input voltage, and the output voltage.

11. The system of claim 7, wherein the control subsystem is further configured to estimate the current difference from an observer that uses a mathematical model of the system and measured states of the system to form an estimate of the current difference.

12. The system of claim 1, wherein the control subsystem is further configured to:

determine a first error signal between the flying capacitor voltage and a reference voltage;

apply a first filter to the first error signal to generate a first intermediate offset signal;

determine a second error signal between: (a) a current difference between a first inductor current through the first power inductor and a second inductor current through the second power inductor and (b) a reference current difference;

apply a second filter to the second error signal to generate a second intermediate offset signal;

sum the first intermediate offset signal and the second intermediate offset signal to generate an offset signal; and selectively increase and decrease the difference in time based on the offset signal.

13. The system of claim 12, wherein:

a gain of the first filter is time varying based on one or more operating parameters of the system; and a gain of the second filter is time varying based on one or more operating parameters of the system.

14. The system of claim 13, wherein the one or more operating parameters comprise one or more of an output load of the SCB2L, the input voltage, and the output voltage.

15. The system of claim 12, wherein the control subsystem is further configured to estimate the flying capacitor voltage and the current difference from an observer that uses a mathematical model of the system and measured states of the system to form estimates of the flying capacitor voltage and the current difference.

16. The system of claim 1, wherein the first power inductor and the second power inductor are integral to a coupled inductor.

17. The system of claim 1, wherein the first power inductor and the second power inductor are integral to a trans-inductor voltage regulator.

18. The system of claim 1, wherein to selectively increase and decrease the difference in time, the control subsystem is configured to increase the first duration while simultaneously decreasing the second duration, or decrease the first duration while simultaneously increasing the second duration.

19. A method, in a system having a series capacitor buck two-level power converter (SCB2L) comprising a plurality of switches, a first power inductor electrically coupled to the plurality of switches, a second power inductor electrically coupled to the plurality of switches, and a flying capacitor electrically coupled to the plurality of switches, wherein the plurality of switches are controllable in a periodic manner among a plurality of switch configurations in order to generate an output voltage from an input voltage received by the SCB2L, wherein the method comprises:

generating an offset signal independent of a duty cycle of the SCB2L; and based on the offset signal, selectively increasing and decreasing, within switching cycles of the SCB2L, a difference in time between:

a first duration of a first switch configuration of the plurality of switch configurations in which electrical charge on the flying capacitor is increased; and a second duration of a second switch configuration of the plurality of switch configurations in which electrical charge on the flying capacitor is decreased, in order to control at least one of a flying capacitor voltage across the flying capacitor and a current difference between a first inductor current through the first power inductor and a second inductor current through the second power inductor.

20. The method of claim 19, further comprising selectively increasing and decreasing the difference in time in order to control a flying capacitor voltage across the flying capacitor.

21. The method of claim 20, further comprising:

determining an error signal between the flying capacitor voltage and a reference voltage;

applying a filter to the error signal to generate an offset signal; and selectively increasing and decreasing the difference in time based on the offset signal.

22. The method of claim 21, wherein a gain of the filter is time varying based on one or more operating parameters of the system.

23. The method of claim 22, wherein the one or more operating parameters comprise one or more of an output load of the SCB2L, the input voltage, and the output voltage.

24. The method of claim 20, further comprising estimating the flying capacitor voltage from an observer that uses a mathematical model of the system and measured states of the system to form an estimate of the flying capacitor voltage.

25. The method of claim 19, further comprising selectively increasing and decreasing the difference in time in order to control a current difference between a first inductor current through the first power inductor and a second inductor current through the second power inductor.

26. The method of claim 25, further comprising:

determining an error signal between the current difference and a reference current difference;

applying a filter to the error signal to generate an offset signal; and selectively increasing and decreasing the difference in time based on the offset signal.

27. The method of claim 26, wherein a gain of the filter is time varying based on one or more operating parameters of the system.

28. The method of claim 27, wherein the one or more operating parameters comprise one or more of an output load of the SCB2L, the input voltage, and the output voltage.

29. The method of claim 25, further comprising estimating the current difference from an observer that uses a mathematical model of the system and measured states of the system to form an estimate of the current difference.

30. The method of claim 19, further comprising:

determining a first error signal between the flying capacitor voltage and a reference voltage;

applying a first filter to the first error signal to generate a first intermediate offset signal;

determining a second error signal between: (a) a current difference between a first inductor current through the first power inductor and a second inductor current through the second power inductor and (b) a reference current difference;

applying a second filter to the second error signal to generate a second intermediate offset signal;

summing the first intermediate offset signal and the second intermediate offset signal to generate an offset signal; and selectively increasing and decreasing the difference in time based on the offset signal.

31. The method of claim 30, wherein:

a gain of the first filter is time varying based on one or more operating parameters of the system; and a gain of the second filter is time varying based on one or more operating parameters of the system.

32. The method of claim 31, wherein the one or more operating parameters comprise one or more of an output load of the SCB2L, the input voltage, and the output voltage.

33. The method of claim 30, further comprising estimating the flying capacitor voltage and the current difference from an observer that uses a mathematical model of the system and measured states of the system to form estimates of the flying capacitor voltage and the current difference.

34. The method of claim 19, wherein the first power inductor and the second power inductor are integral to a coupled inductor.

35. The method of claim 19, wherein the first power inductor and the second power inductor are integral to a trans-inductor voltage regulator.

36. The method of claim 19, wherein selectively increasing and decreasing the difference in time comprises increasing the first duration while simultaneously decreasing the second duration, or decreasing the first duration while simultaneously increasing the second duration.

* * * * *